US006205237B1

(12) United States Patent
Focke et al.

(10) Patent No.: US 6,205,237 B1

(45) **Date of Patent: *Mar. 20, 2001**

(54) METHOD AND DEVICE FOR THE OPTO-ELECTRICAL SCANNING OF PACKETS, ESPECIALLY CIGARETTE PACKETS

(75) Inventors: Heinz Focke, Verden; Burkard Rösler, Blender; Henry Buse, Visselhövede, all of (DE)

(73) Assignee: Focke & Co. (GmbH & Co.), Verden (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,533

(22) Filed: Jul. 1, 1997

(30) Foreign Application Priority Data

Jul. 5, 1996 (DE) ............................................ 196 27 225

(51) Int. Cl.[7] ...................................................... G06K 9/00

(52) U.S. Cl. ............................................ 382/141; 382/143

(58) Field of Search .................................... 382/141, 100; 209/74 R; 356/163, 156, 394

(56) References Cited

U.S. PATENT DOCUMENTS

| | | | | |
|---|---|---|---|---|
| 3,939,984 | * | 2/1976 | Butner et al. | 209/74 R |
| 4,205,973 | * | 6/1980 | Ryan | 356/380 |
| 4,624,367 | | 11/1986 | Shafer et al. | 209/577 |
| 4,912,554 | * | 3/1990 | Neri | 356/237 |
| 5,037,245 | * | 8/1991 | Smith | 406/88 |

FOREIGN PATENT DOCUMENTS

| | | | | |
|---|---|---|---|---|
| 1288016 | | 1/1969 | (DE) . | |
| 2935941 | | 5/1985 | (DE) | G01B/11/02 |
| 3510328 | | 10/1985 | (DE) | G01B/21/02 |
| 3510363 | | 9/1986 | (DE) | G01N/15/02 |
| 3801388 | | 7/1988 | (DE) | G01B/11/00 |
| 4112263 | | 10/1992 | (DE) | G01M/11/08 |
| 4312550 | | 9/1994 | (DE) | B65B/57/10 |
| 330495 | | 8/1989 | (EP) | B65B/19/28 |
| 0330495 | * | 8/1989 | (EP) | B65B/19/28 |
| 2658098 | | 8/1991 | (FR) | B07C/5/10 |

* cited by examiner

*Primary Examiner*—Jose L. Couso
*Assistant Examiner*—Duy M. Dang
(74) *Attorney, Agent, or Firm*—Sughrue, Mion, Zinn, Macpeak & Seas, PLLC

(57) ABSTRACT

Known devices for the opto-electrical scanning of individual cubic or cuboid-shaped packets 10, 19, transported at a distance from one another, have the disadvantage that they do not permit simultaneous scanning of all the packet walls. In the device according to the invention, the conveying distance 26 for transporting the packets is interrupted in the region of a testing station 27. The packets 10, 19 to be examined are moved in this region along an aerodynamic trajectory or falling distance. Consequently, all the walls of the packets 10, 19 to be scanned may be scanned simultaneously on all sides.

11 Claims, 5 Drawing Sheets

METHOD AND DEVICE FOR THE OPTO-ELECTRICAL SCANNING OF PACKETS, ESPECIALLY CIGARETTE PACKETS

BACKGROUND OF THE INVENTION

The invention relates to a method of opto-electrical scanning of individual packets, transported at a distance from one another, such as cigarette packets, in accordance with the preamble of patent claim 1. In addition, the invention relates to a device for the opto-electrical scanning of packets in accordance with the preamble of patent claim 4.

Packets, especially cigarette packets, are very thoroughly examined in the region of a packaging machine to check that they are correctly formed. Cigarette packets are thus, for example, examined to see whether they are provided with the correct band label or whether the sides of the packet are printed completely and in accordance with the regulations—amongst other things with a safety warning. The packets are checked photographically, especially with the aid of cameras installed in a fixed position. The cameras scan outer surfaces of the packets. Data obtained by this process are compared with reference data; where there are undesired deviations, faulty packets are steered out of the production flow.

SUMMARY OF THE INVENTION

Many kinds of methods and devices for the opto-electrical scanning of cigarette packets are known. Thus U.S. Pat. No. 4,972,494 shows a device for the opto-electrical scanning of cigarette packets in which the cigarette packets lie with one wall of the packet on a conveyor and are moved in this position by the conveyor past testing devices. This scanning device has, however, the disadvantage that the wall of the packet lying on the conveyor cannot be scanned by the testing devices. Thus it is not possible to check whether the wall of the cigarette packet lying on the conveyor is correctly formed.

In the device for the electro-optical scanning of cigarette packets according to DE-A-38 01 388, the cuboid-shaped cigarette packets are moved past testing devices with one of the packet walls in contact with a conveyor belt affected by suction air. Free walls of the cigarette packet can be detected by a testing device arranged beside the transport path. A second conveyor belt, connected to a first conveyor belt and likewise affected by suction air, detects an opposite wall of the cigarette packet. A second testing device then detects the wall of the cigarette packet covered by the first conveyor belt and now lying free. The device according to DE-A-38 01 388 requires great constructional outlay. The conveyor belts which can be affected by suction air require a high, permanent expenditure of energy.

SUMMARY OF THE INVENTION

The problem underlying the invention, therefore, is to propose a method and a device for the opto-electrical scanning of packets, which make possible the scanning of the walls of packets on all sides with very little constructional outlay.

To solve this problem, the method according to the invention is characterised by the measures of patent claim 1. Due to the fact that the packets are moved past the or each testing device along an aerodynamic trajectory or falling distance, all the walls of the packets can be scanned simultaneously with very little outlay.

The idea underlying the invention, therefore, is to move the packets, with the aid of an oblique, horizontal or perpendicular throw or with the aid of free fall, past the testing devices without touching them. As a result of this, all the walls of the packets lie free in the region of the testing devices. The testing devices can scan the walls of the packets unimpeded, i.e. without the interfering influence of guides or conveyor belts.

The device according to the invention is characterised by the features of patent claim 4. It makes possible the simultaneous scanning of the packets on all sides with very little constructional outlay.

By preference, a second conveying section of a feed-in conveyor has a lower continuous conveyor and an upper continuous conveyor which grasp the packets on opposite packet walls. This guarantees exact guiding and expedition of the packets and thus an exact aerodynamic trajectory of same.

Preferred developments of the invention arise from the secondary claims and the specification. Embodiments of the invention, given by way of example, are explained in greater detail below with the aid of the drawing. In the drawing:

DESCRIPTION OF PREFERRED EMBODIMENTS

Figure 1:
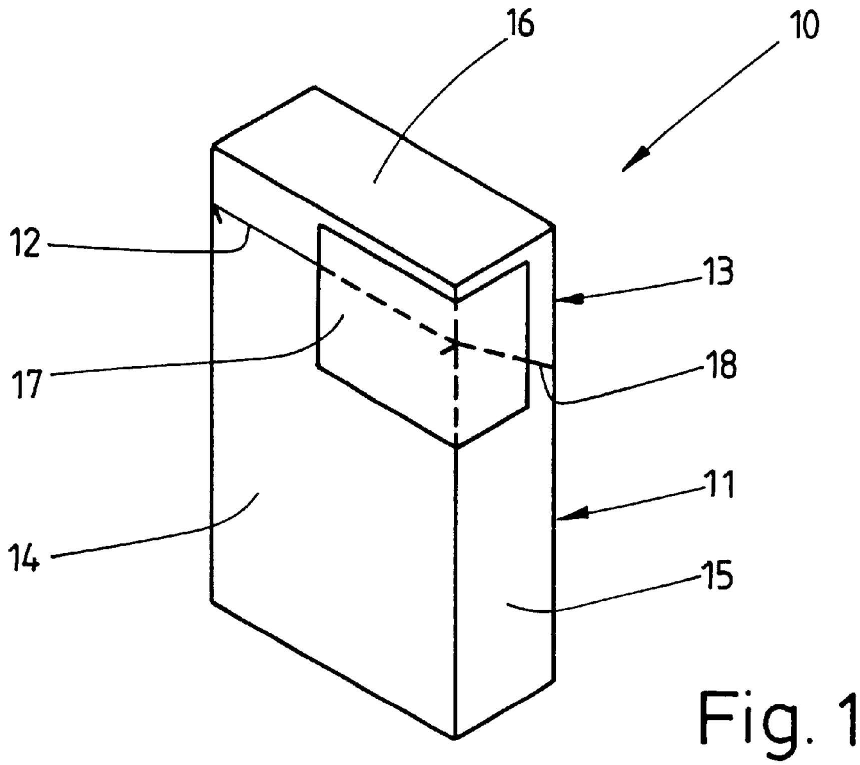
FIG. 1 shows a first cigarette packet to be scanned, namely a hinge-lid packet, in perspective side view.

The embodiments shown in the drawing of a testing apparatus serve the opto-electrical scanning of cigarette packets with the aid of testing devices, namely cameras.

Figure 2:
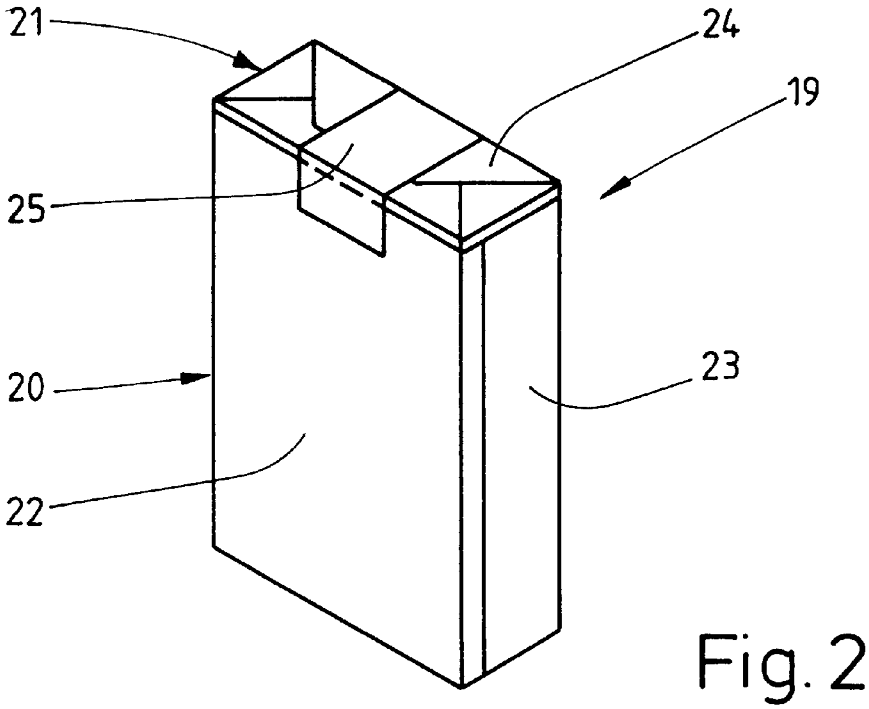
FIG. 2 shows a second cigarette packet to be scanned, namely a soft case packet, in a view analogous to FIG. 1.

FIGS. 1 and 2 show diagrammatically cigarette packets which can be scanned with the aid of the device according to the invention. The cigarette packet according to FIG. 1 is a folding packet 10 which can also be referred to as a hinge-lid packet. The hinge-lid packet 10 consists of a packet portion 11 plus a lid 13 hinged to packet portion 11 via a hinge line 12. The hinge-lid packet 10 is delimited by packet walls of different size, namely by a front wall, not shown, a rear wall 14, comparatively narrow, elongated side walls 15, a front face 16 in the region of the lid 13 and by a base wall, not shown, in the region of packet portion 11. A band label 17 extends over a partial region of the rear wall 14 and of a side wall 15 adjoining the rear wall 14. The band label 17 partially covers the hinge line 12 in the region of the rear wall 14 and a butt joint 18 between packet portion 11 and lid 13 in the region of the side wall 15.

The cigarette packet according to FIG. 2 is a soft-case packet 19. In a pouch 20, open at the top, of the soft case packet 19, there is positioned a group of cigarettes 21 wrapped in an inner wrapping made of tin foil or the like. The soft case packet 19 is also delimited by packet walls of different size. These are a front wall 22 and a rear wall, not shown. Front wall 22 and rear wall are interconnected by comparatively narrow, elongated side walls 23. In addition, the soft case packet 19 is delimited by a base wall, not shown, in the region of the pouch 20 and a front wall 24 in the region of the group of cigarettes 21. A strip-shaped region of the front wall 24 plus partial regions adjacent thereto of the front wall 22 and the rear wall are covered by a band label 25.

With the devices according to the invention and described in detail below, it is now possible, for example, to check that the band labels 17, 25 are correctly applied to the hinge-lid packet 10 on the one hand or the soft case packet 19 on the other hand.

Figure 3:
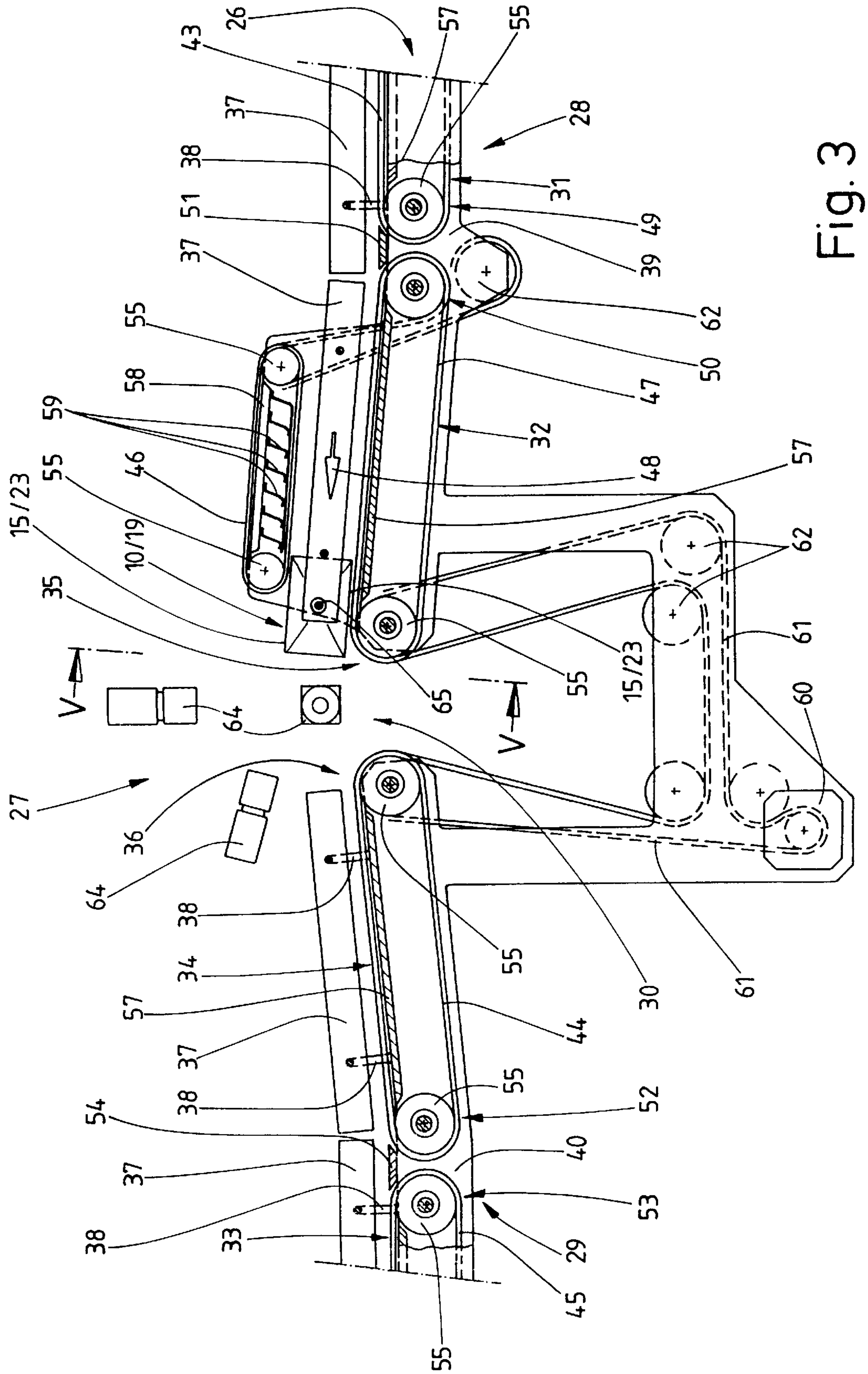
FIG. 3 shows a device according to the invention as per a first embodiment of the invention, given by way of example, in side view.
Figure 4:
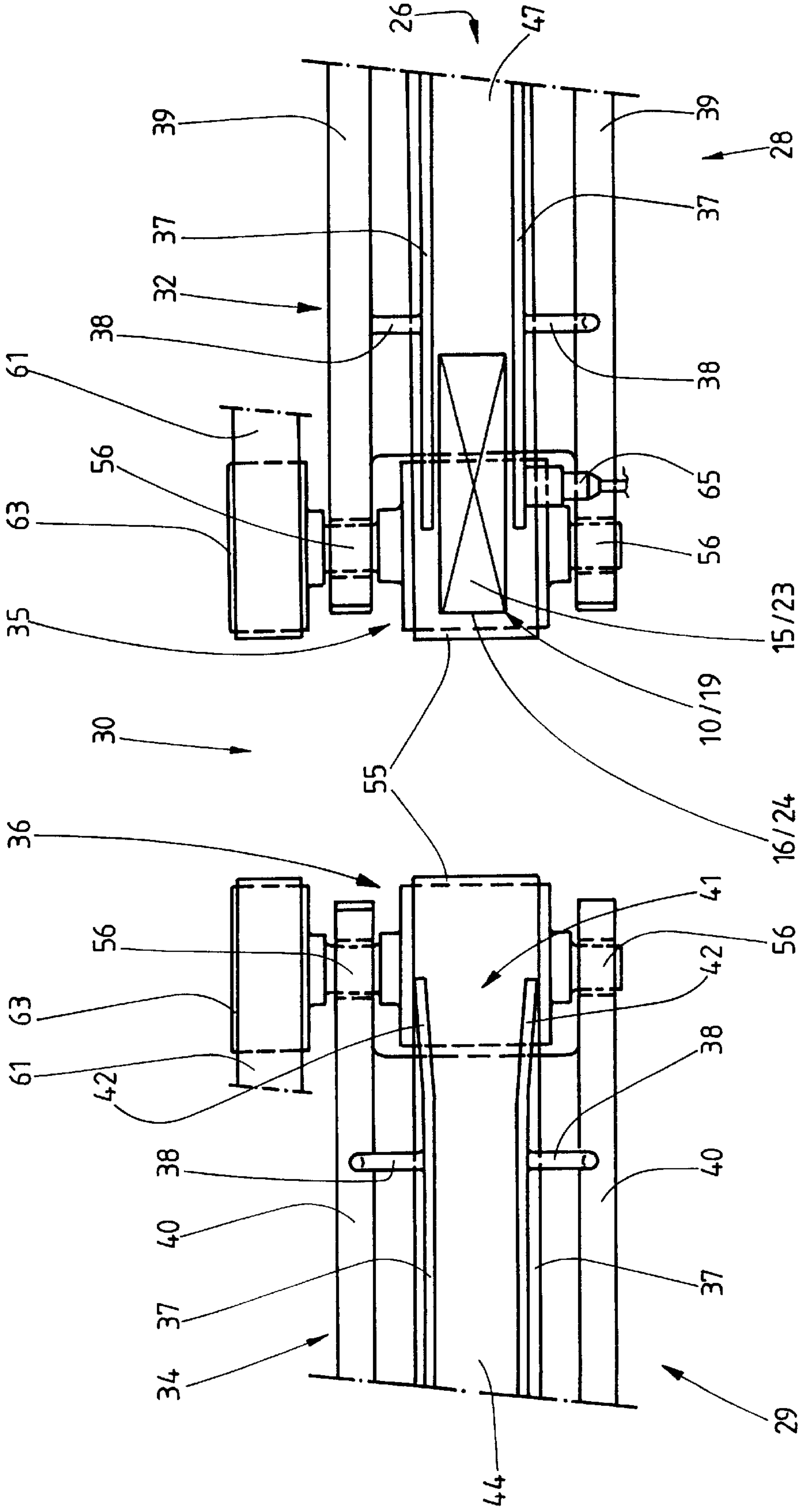
FIG. 4 shows a detail of the device according to the invention as per FIG. 3 in plan view.
Figure 5:
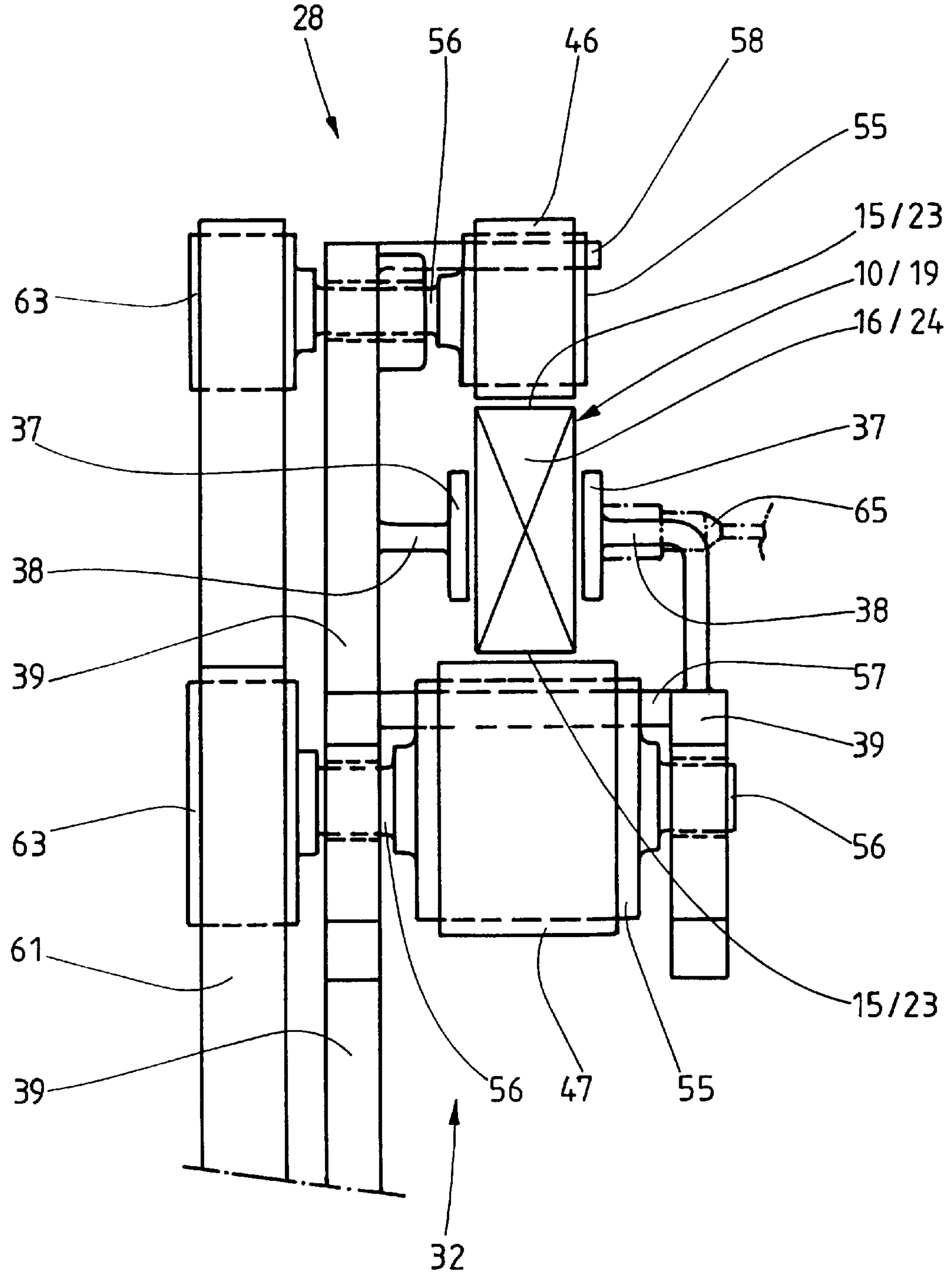
FIG. 5 shows a partial cross-section through the device according to the invention along the intersection line V—V in FIG. 3.

In first embodiment of the device according to the invention and as per FIGS. 3 to 5, the cigarette packets 10, 19 produced by a packaging machine, not shown, may be transported along a conveying distance or path 26 and examined in the region of a testing station 27 to check that they are correctly formed. The conveying distance 26 is formed by a feed-in conveyor 28 and an onward conveyor 29. With the aid of the feed-in conveyor 28, the cigarettes packets 10, 19 are transported into the proximity of the testing station 27, namely into a testing region 30. In the area of the testing region 30 or the testing station 27, the conveying distance or path 26 is interrupted for form an open space between the end of feed-in conveyor 28 and the beginning of onward conveyor 29, as clearly shown in FIGS. 3 and 4, for example. The cigarette packets 10, 19 pass the testing station 27 along an aerodynamic trajectory. Once they have passed the testing station 27 or the testing region 30, the cigarette packets 10, 19 are taken on to the onward conveyor 29. This conveyor 29 transports the cigarette packets 10, 19 out of the device according to the invention, maintaining the predetermined distances of the cigarette packets 10, 19 from one another.

The feed-in conveyor 29 consists of a first conveying section 31 running horizontally plus a second conveying section 32 inclined in relation to the first conveying section 31 and thus running at an angle. In the embodiment shown here, the second conveying section 32 is inclined at an angle of approximately 5° higher than the first conveying section 31. The cigarette packets 10, 19 are correspondingly moved by the second conveying section 32 of the feed-in conveyor 28 along a slightly rising sloping plane into the testing region 30.

The conveying speed of the first conveying section 31 of the feed-in conveyor 28 amounts to approximately one meter per second. The second conveying section 32 of the feed-in conveyor 28 is driven at a higher speed than the first conveying section 31. In the present case, the second conveying section 32 is driven at twice the conveying speed by comparison with the first conveying section 31, i.e. at approximately 2 meters per second.

The onward conveyor 29 connects with the feed-in conveyor 28 at a distance. Like the feed-in conveyor 28, the onward conveyor 29 consists of a first conveying section 33 running horizontally and a second conveying section 34 inclined in relation to the first conveying section 33 and thus running at an angle. The second conveying section 34 is here preferably inclined at an angle of 5° in relation to the first conveying section 33. The conveying speeds of the conveying sections 33, 34 of the onward conveyor 29 are preferably adapted to the conveying speeds of the conveying sections 31, 32 of the feed-in conveyor 28. The second conveying section 34 of the onward conveyor 29 is therefore driven at twice the speed in relation to the first conveying section 33, in the present case at 2 meters per second.

The conveying distance or path 26 is interrupted to form the space between the inclined second conveying sections 32, 34 of feed-in conveyor 28 and onward conveyor 29. The testing station 27 is arranged in this region. An end 35, turned towards the testing station 27, of the feed-in conveyor 28 or its second conveying section 32 and an end 36, turned towards the testing station 27, of the onward conveyor 29 or its second conveying section 35 accordingly enclose the testing region 30. The ends 35, 36 are spaced at a distance from one another to form the open space between the conveyors 28 and 29. The distance is by preference 80 mm. The angle of inclination of the second conveying section 32 of the feed-in conveyor 28, whose conveying speed and the distance between the ends 35, 36 of feed-in conveyor 28 and onward conveyor 29 are adapted to one another in such a way that the cigarette packets 10, 19, after they have passed the open space in the testing region 30 along the aerodynamic trajectory, land safely and in the correct position on the onward conveyor 29, or its second conveying section 34. Depending on the angles of inclination of the second conveying sections 32, 34 and of the or space distance between the ends 35, 36, the conveying speed of the second conveying sections 32, 34 can vary. The necessary speed of the second conveying section 32 of the feed-in conveyor 28 for a throw adapted to the width of the testing region 30 arises from the physical basic equations relating to an upwardly-directed, oblique throw. The movement of the cigarette packets 10, 19 through the testing region 30 along the aerodynamic trajectory is therefore determined by the initial parameters of angle of inclination and conveying speed of the second conveying section 32.

In order to guarantee that the cigarette packets 10, 19 are carried exactly and in the correct position through the device according to the invention, guides 37 are arranged along the conveying distance 26 on both sides of the cigarette packet 10, 19. The guides 37 prevent the cigarette packets 10, 19 from slipping out sideways as they are carried along the conveying distance 26. The guides 37 are fastened via cross bars 38 to carrying bars 39, 40 of the feed-in conveyor 28 or onward conveyor 29. At the end 36, turned towards the testing region 30, of the onward conveyor 29 or its second conveying section 34, the guides 37 form a collecting area 41 for the cigarette packets 10, 19. For this purpose, the guides 37 are enlarged in a funnel shape at their ends 42. This makes possible safe landing of the cigarette packets 10, 19 in the collecting area 41. Tipping over of the packets once they have landed in the collecting area 41 on the guides 37 is excluded.

The first conveying section 31 of the feed-in conveyor 28 and the first 33 and second 34 conveying sections of the onward conveyor 29 are in each case formed by a continuous conveyor, namely a belt conveyor 43, 44, 45. The cigarette packets 10, 19 lie on the belt conveyors 43, 44, 45 as they are transported through the conveying distance 26. The second conveying section 32 of the feed-in conveyor 28 is formed by an upper continuous conveyor and a lower continuous conveyor, namely by an upper belt conveyor 46 and a lower belt conveyor 47. The cigarette packets 10, 19 are conveyed between the conveying lengths facing one another of the belt conveyors 46, 47 of the second conveying section 32 of the feed-in conveyor 28. In the region of the second conveying section 32 of the feed-in conveyor 28, the cigarette packets 10, 19 are therefore grasped by the belt conveyors on two opposite packet walls. By this means, the position of the cigarette packets 10, 19 is stabilized before they leave the feed-in conveyor 28 and thus before they are thrown over the testing region 30. The upper belt conveyor 46 and the lower belt conveyor 47 of the second conveying section 32 of the feed-in conveyor 28 are here driven at the same conveying speed.

As the cigarette packets 10, 19 are transported through the device according to the invention in the transport direction 48, the cigarette packets 10, 19 lie with a narrow, elongated side wall 15, 23 first on the conveying length of the belt conveyor 43 of the first conveying section 31 of the feed-in conveyor 28. The end wall 16, 24 of the cigarette packet 10, 19 points in the transport direction 48. Then the cigarette packets 10, 19 are passed on to the second conveying section 32 of the feed-in conveyor 28. In order to guarantee here the safe transfer of the cigarette packets 10, 19, a bridge 51 is arranged between the adjacent ends 49, 50 of the belt conveyors 43, 47. In the region of the second conveying section 32 of the feed-in conveyor 28, the cigarette packets 10, 19 are grasped by the belt conveyors 46, 47 on both side walls 15, 23. Once the cigarette packets 10, 19 have been thrown over the testing region 30, they are moved by the belt conveyors 44, 45 of the onward conveyor 29 out of the device according to the invention. A bridge 54 is also arranged between adjacent ends 52, 53 of belt conveyors 44, 45.

All the belt conveyors 43 . . . 47 are lead over deflection rollers 55. The deflection rollers 55 of the belt conveyors 43 . . . 47 are mounted via pegs 56 in the carrying bars 49, 50 of feed-in conveyor 28 and onward conveyor 29. In the region of the second conveying section 32 of the feed-in conveyor 28, the carrying bar 39 is drawn for this purpose into the region of the upper belt conveyor 46.

The conveying lengths of the belt conveyors 43, 44, 45, 47 are in each case stabilized by a guide plate 57. The same is true for the upper belt conveyor 46 which is stabilized by a guide plate 58. The guide plates 57 in the region of the belt conveyors 43, 44, 45, 47 prevent the conveying length facing the cigarette packets 10, 19 to be transported from sagging downwards. Pressure members 59, namely leaf springs, are arranged on the conveying plate 58 of the upper belt conveyor 46 of the second conveying section 32 of the feed-in conveyor 28. With the aid of the pressure members 59 or leaf springs, the conveying length of the upper belt conveyor 46 is pressed on to the wall of the cigarette packet 10, 19 facing upwards. This guarantees that cigarette packets 10, 19 of different formats are accurately transported and expedited.

The belt conveyors 44, 46, 47 of the second conveying sections 32, 34 of feed-in conveyor 28 and onward conveyor 29 are driven by a common drive mechanism 60, namely a motor, at the same conveying speed. Transmission of the driving power of the drive mechanism 60 to the belt conveyors 44, 46, 47 is effected via a drive belt 61. The drive belt 61 is led over a plurality of deflection rollers 62 into the region of belt conveyors 44, 46, 47. Drive rollers 63 mounted coaxially with the deflection rollers 55 of belt conveyors 44, 46, 47 ultimately transmit the driving power of the drive mechanism 60 to the belt conveyors.

The testing station 27 is arranged in the testing region 30. This station consists of a plurality of testing devices 64. In the embodiment according to FIG. 3, the testing station 27 has three testing devices 64. These are in the form of cameras. As the cigarette packets 10, 19 are thrown through the testing region 30, the cigarette packets 10, 19 are moved past the testing devices 64 along a sloping aerodynamic trajectory. During this movement, the cigarette packets 10, 19 are scanned by the testing devices 64. Since the cigarette packets 10, 19 are not supported on the trajectory either by belt conveyors or any other guides, the testing devices 64 can scan the cigarette packets 10, 19 on all sides unimpeded.

On the end 35 turned towards the testing region 30 or the testing station 27 of the feed-in conveyor 28 or its second conveying section 32, there is arranged a sensor 65. The sensor 65 is here fastened to one of the guides 37. The sensor 65 monitors the transporting of the cigarette packets 10, 19 along the conveying distance 26. If a cigarette packet 10, 19 is moved by the second conveying section 32 of the feed-in conveyor 38 into the testing region 30, a control signal for the testing devices 64 of the testing station 27 is generated by the sensor 65. The control signal of the sensor 65 activates the testing devices 64, if necessary at a time interval from one another, so that the walls of the cigarette packet 10, 19 are scanned at the correct time.

Figure 6:
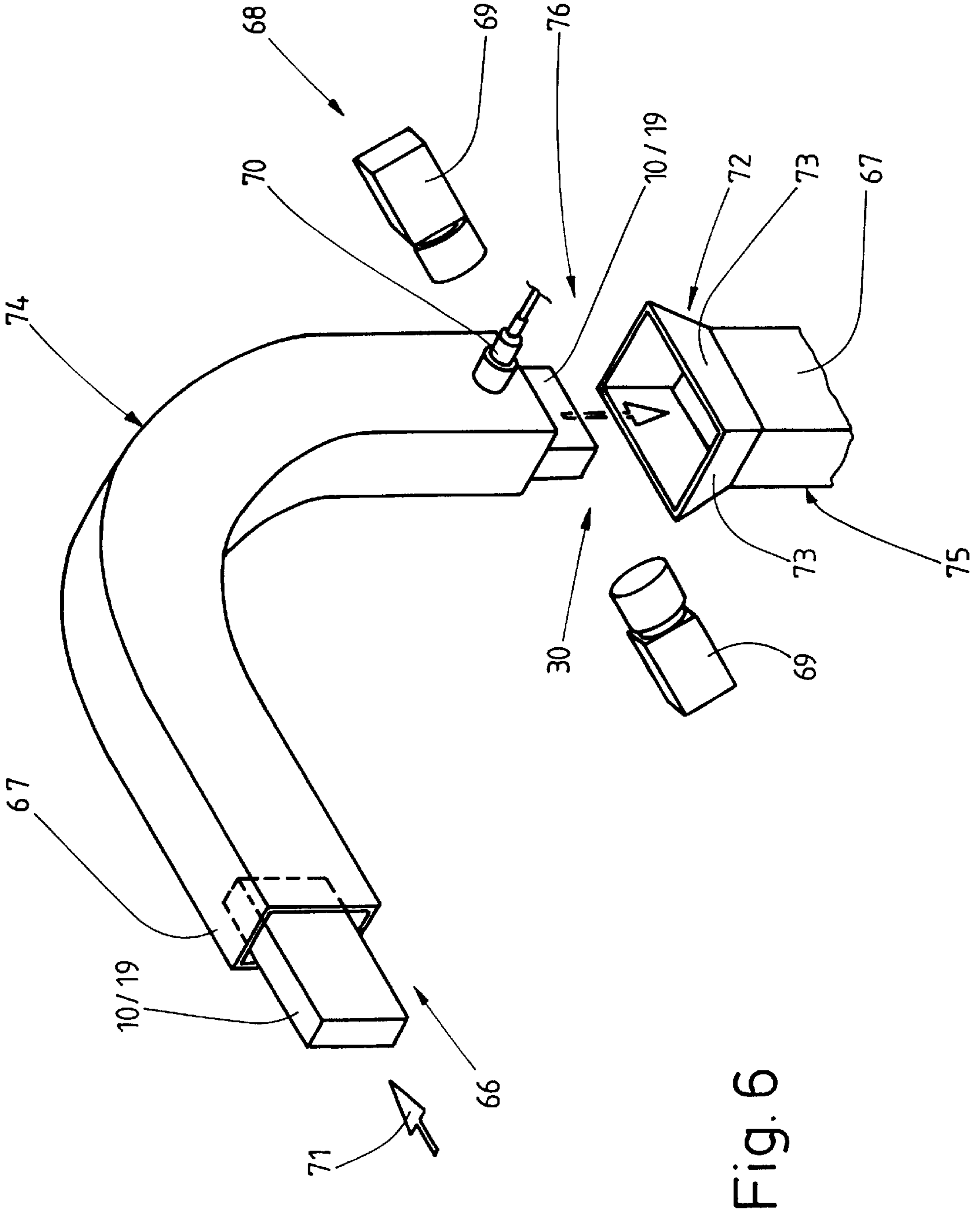
FIG. 6 shows a device according to the invention as per a second embodiment of the invention, in perspective side view.

FIG. 6 shows a second embodiment, given by way of example, of a device according to the invention for the electro-optical scanning of cigarette packets. A conveying distance 66 for the cigarette packets 10, 19 is formed by a pipe 67. There is a break in the pipe 67 in a perpendicular section, i.e. one running vertically. A testing station 68 or a testing region 76 with two testing devices 69 is arranged in this region. Thus, in the conveying direction 71 before the testing station 68, the pipe 67 forms a feed-in conveyor 74. In the conveying direction 71 following on from the testing station 68, the pipe 67 forms an onward conveyor 75.

Whilst the cigarette packets fall through the testing station 68, the testing devices 69 can scan all the walls of the cigarette packets 10, 19. In a similar way to the embodiment according to FIGS. 3–5, the testing devices may here be controlled by a sensor 70.

In a section, facing the testing station 68, of the onward conveyor 75 or the pipe 67, said section has a collecting area 72 for the cigarette packets 10, 19. Walls 73 of the pipe 67 are enlarged in the shape of a funnel for this purpose.

It goes without saying that a large number of devices different from the embodiments shown in the drawing can be imagined for carrying out the method according to the invention. If the cigarette packets are to be moved along a perpendicular or even horizontal aerodynamic trajectory through a testing region, it lies within the average skill of the expert to adapt accordingly the devices shown in the drawing.

What is claimed is:

1. A method for the opto-electrical contactless scanning of packs (10, 19) being transported at a distance from one another, said method comprising the steps of:

- contactlessly scanning the packs by a plurality of testing devices (64, 69) during the transport and along a free-falling contact trajectory or drop path in an open space;
- moving the packs (10, 19) past said testing devices (64, 69) and along a free-falling non-supported contactless trajectory or drop path in an open space;
- positioning the testing devices (64, 69) in a region of the path of the packs (10, 19); and
- scanning all sides of each of the packs (10, 19), during their free movement along the in the open space, by the testing devices (64, 69);
- wherein the packs are transported by a pack conveyor along a conveying path (26), said method further comprising the steps of:
- dividing the pack conveyor into a feed-in conveyor (28, 74) and an onward conveyor (29, 75) with said open space therebetween;

arranging the feed-in conveyor (28, 74) to end at the beginning of the testing region (30, 76), and the onward conveyor (29, 75) to begin at the end of the testing region (30, 76);

transporting the packs (10, 19) by the feed-in conveyor in such a way that the packs (10, 19) are moved in the testing region (30, 76) along the path, and at the end of the testing region (30, 76) are taken over by the onward conveyor (29, 75) for further transport;

positioning the testing devices (64, 69) in the testing region (30, 76); and positioning the testing devices (64, 69) in such a way that the packs (10, 19) are scanned by the testing devices (64, 69) on said all sides during movement of the packs along the path.

2. The method according to claim 1, further comprising the step of, before the packs reach their trajectory or drop path, moving the packs (10, 19) past a sensor (65, 70) which controls said testing devices (64, 69) by activating said testing devices to execute the scanning of a pack (10, 19).

3. An apparatus for the opto-electrical scanning of individual packs (10, 19) being transported in a longitudinal direction at a distance from one another along a conveying path (26, 66) in a conveying direction, and moved past at least one testing device (64, 69) in a region of a testing station (27, 68), said apparatus comprising:

a feed-in conveyor (28, 74) and a following onward conveyor (29, 75) forming part of the conveying path (26, 66);

in an open space interrupting the conveying path between an end of the feed-in conveyor (28, 74) and a start of the following onward conveyor (29, 75), a testing region (30, 76) for the packs (10, 19);

means for moving the packs (10, 19), in the testing region (30, 76) between the feed-in conveyor (28, 74) and the onward conveyor (29, 75), along a free-falling and non-supported, contactless trajectory or drop path in said open space; and positioned in the testing region (30, 76), a plurality of testing devices (64, 69) which are directed at the packs (10, 19) in a region of the trajectory or drop path so that all sides of each free-falling pack are scanned by said testing devices.

4. The apparatus according to claim 3, wherein the conveying path (26) is horizontal, the packs are fed to the testing region (30) along the horizontal conveying path (26), and the feed-in conveyor (28), forming a part of the conveying path (26) in a section adjacent to the testing region (30), is inclined upward in the conveying direction such that the packs (10, 19) are conveyed into the testing region (30) along a rising trajectory.

5. The apparatus according to claim 4, wherein the onward conveyor (20) is inclined downward and forms a part of the conveying path (26) adjoining the testing region (30).

6. The apparatus according to claim 5, wherein each of the feed-in conveyor (28) and the onward conveyor (29) comprises a horizontal first conveying section (31, 33) and an inclined second conveying section (32, 34) respectively adjacent to the testing region (30).

7. The apparatus according to claim 6, wherein the second conveying section (32) of the feed-in conveyor (28) has a lower continuous conveyor (47) and an upper continuous conveyor (46) which grasp the packs on opposite pack walls and which are driven at the same conveying speed.

8. The apparatus according to claim 7, wherein the second conveying section (32) of the feed-in conveyor (28) is driven at a greater conveying speed than the first conveying section (31) of the feed-in conveyor (28).

9. The apparatus according to claim 3, further comprising a sensor (65), adjacent the feed-in conveyor at an end (25) thereof facing the testing region (30), for monitoring the packets in the trajectory or drop path and controlling each testing device (64) located in the testing region (30).

10. The device according to claim 9, further comprising a collecting area (41) for collecting the packs and being located adjacent the onward conveyor (29) at an end (36) thereof facing the testing region, wherein the collecting area is formed by funnel-shaped guides (37) arranged along the onward conveyor (29).

11. The apparatus according to claim 10, wherein the feed-in conveyor (74) and onward conveyor (75) are configured as a closed pipe (67) having a rectangular cross-section, and wherein the packs (10, 19) are guided by the feed-in conveyor into a vertical, downwardly directed conveying direction, the testing region (76) being formed by the open space between the feed-in conveyor (74) and the onward conveyor (75), and being spaced at a distance below the feed-in conveyor (74).

* * * * *